Oct. 3, 1950     L. J. RICHARDSON     2,524,476
VERTICAL TUYERE-TYPE FURNACE
Filed Oct. 22, 1946
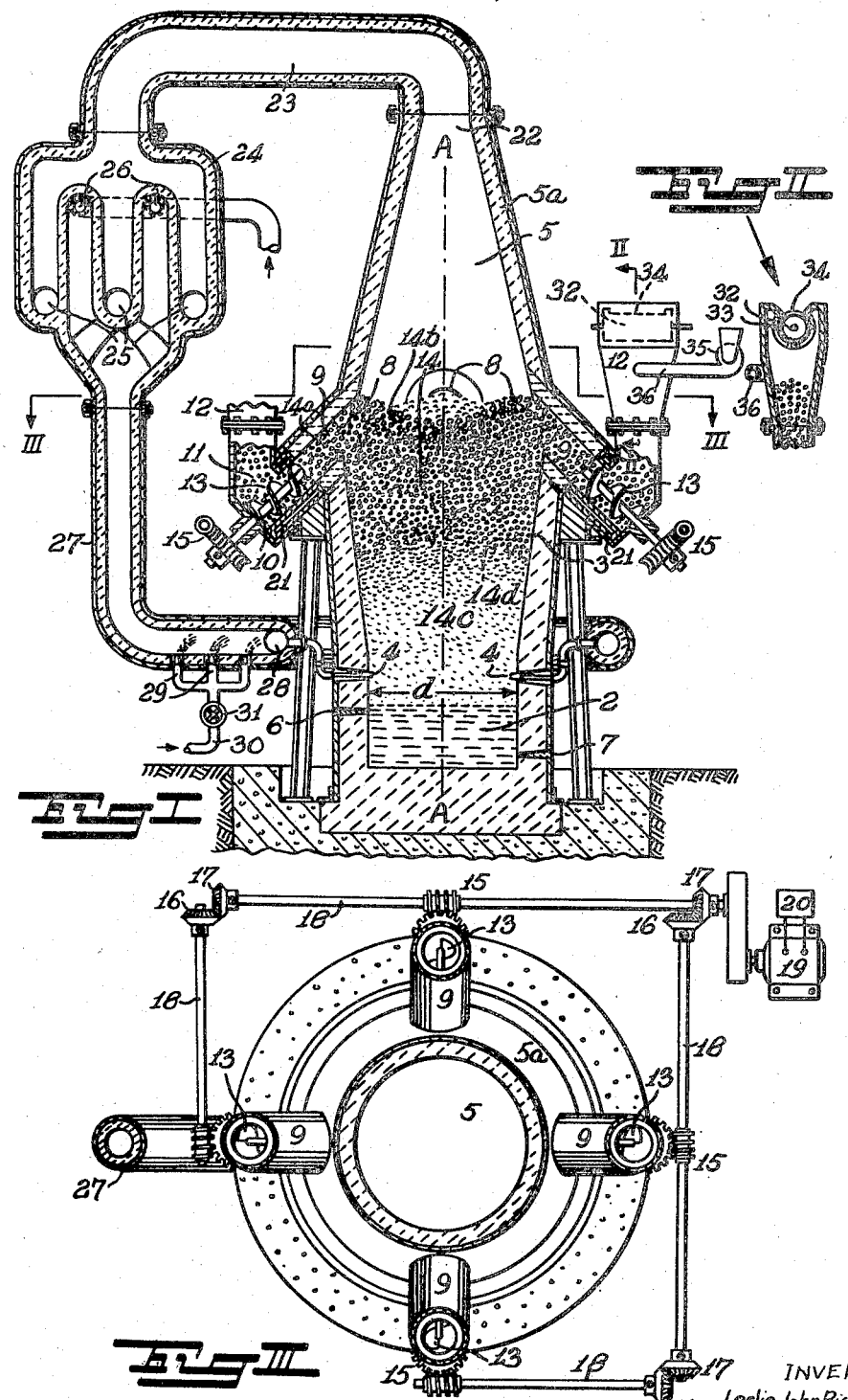
INVENTOR
Leslie John Richardson
By Robert E. Burns
ATTORNEY Patented Oct. 3, 1950

2,524,476

UNITED STATES PATENT OFFICE 2,524,476

VERTICAL TUYÈRE-TYPE FURNACE

Leslie John Richardson, Germiston, Transvaal, Union of South Africa

Application October 22, 1946, Serial No. 704,948
In the Union of South Africa October 25, 1945

8 Claims. (Cl. 263—29)

The invention relates to vertical furnaces of the tuyère type, which are enclosed in the sense that, during operation of the furnace, included in the charging of material into the furnace cavity, said cavity is sealed against free entry of atmospheric air otherwise than through the tuyères, and is generally at a pressure above that of the atmosphere; and which are utilised to smelt mineral matter and particularly metallic ores.

Furnaces of the kind in question comprise a well-like hearth, and generally a bosh; a shaft into which charge material is fed and down which such material moves towards and into the fusion zone, and tuyères arranged around the hearth for forcibly injecting blast air into the furnace cavity.

Known furnaces of the type in question make use of feeding devices which charge material from the top of, and downwardly into, the shaft. Such devices are shielded to some extent by the depth of charge material below them, from hot furnace gases and from heat radiated upwardly from the hearth, but they are nevertheless required to operate under exacting conditions and are liable to be damaged by being burnt or warped, particularly if the furnace temperature is in excess of that normally present in furnaces of this type.

It is one of the objects of the invention to provide feeding means which is not subject to damage by hot furnace gases or by radiation of heat, or at least not to the same extent as are the devices presently found in furnaces of the kind in question; and which is particularly suitable to be used in furnaces of the tuyère type in which higher temperatures obtain than is usual.

It is a further object of the invention to provide feeding means suitable to be used in a furnace of the tuyère type intended for operation with a charge burden which, for reasons which are set out later in this specification, is much restricted in depth in comparison with the depth of burden presently employed.

According to the invention, the said feeding means is positioned to feed charge material laterally into the furnace cavity above the fusion zone, and is adapted to preserve continuously the separation of the furnace cavity from the atmosphere at the feeding point or points.

Further according to the invention said lateral means comprises a mechanical feeding device, or a series of mechanical feeding devices, the or each device being arranged to propel charge material into the furnace cavity, and being so constructed and positioned that, throughout operation of the furnace, a shielding body of charge material is present between such device and the said cavity.

Preferably there are several feeding devices positioned symmetrically around the furnace shaft, each device being arranged to feed material at a rate which is equal to the feeding rate of the other device or each of the other devices.

Further according to the invention, there is comprised a conduit associated with the or each feeding device, and external to the furnace cavity, one end of the or each conduit communicating therewith; and the or each feeding device is positioned to propel charge material along its associated conduit and into the furnace cavity; at least a portion of said shielding body of charge material being contained within the or each conduit.

The conduit or each of the conduits may be a feeder tube containing the or one of the feeder devices, and preferably the or each conduit or tube, is arranged at an upward angle towards the furnace shaft, so that the shielding body of charge material is maintained gravitationally within the conduit or tube throughout the operation of the furnace.

The preferred feeding device comprises a feeder screw since this mechanism combines with simplicity and ease of installation and operation the advantage that it enables charge material to be fed contiuously to the furnace cavity.

If more than one feeder device is provided, each is conveniently served by a separate external hopper; and to minimize the possibility of furnace gases penetrating through the body of charge material and reaching the atmosphere, the gaseous pressure within the or each hopper may be maintained above the gaseous pressure within the furnace cavity.

Certain ores of common occurrence tend to arch in the shaft of the furnace and to form a plastic mass resisting descent of the charge and ascent of the blast. Applicant has found that this tendency is avoided if the depth of burden is restricted to a depth which is substantially less than is the case in ordinary blast furnace practice. Such restricted depth may be defined as that which, above the level of the tuyères, is substantially equal to twice the diameter of the hearth at tuyère level. In practice, the restricted burden may be such that the top of the burden is not much above the fusion zone so that charge material is being added to the burden near to such zone. Accordingly, the present invention provides that the feeding means may be positioned to feed charge material in proximity to the fusion zone. More specifically, said feeding means is positioned to feed charge material into the furnace cavity at a height above the furnace tuyères which is substantially equal to twice the diameter of the furnace hearth at tuyère level.

It has been stated earlier in this specification that the feeding means of the invention is particularly suitable to be used in furnaces of the tuyère type in which higher temperatures obtain than is usual in that type of furnace. Hereinafter, applicant proposes means to enable such higher temperatures to be attained; and a furnace comprising such means, in combination with the features described above, is one which may satisfactorily be used for the treatment of ores which normally require the higher furnace temperature just mentioned. In particular such combination may successfully be used for the treatment of ores which require such higher temperature and which, in addition, tend to arch in the furnace shaft, as is abovementioned. Examples of such ores are the low grade chromium ores and a furnace comprising the combination of means abovementioned, is particularly well adapted to reduce these ores.

The manner proposed by applicant to attain such higher temperatures, is by heating the blast to a temperature above that which is economically possible in ordinary blast furnaces. It is known that the temperature attainable within the furnace is dependent on the temperature of the blast, and it is therefore normal blast furnace practice to heat the blast by heat exchange with waste furnace gases. The extent to which the blast air can be thus heated is, however, limited by the temperature of the waste gases, and by the amount of heat which can be economically transferred to the air at the velocity at which the latter passes through the heat exchanger. While the furnace temperature resulting from such heat transfer is adequate for the purposes for which the normal blast furnace is used, it is insufficient to reduce the ores mentioned in the last preceding paragraph.

Applicant proposes to increase the temperature of the blast above that economically obtainable by normal heat-exchange means by burning fluent fuel in the blast air. Accordingly the present invention provides a furnace comprising the features described above and comprising also means to burn fluent fuel in the conduit through which the blast is delivered to the furnace.

The said fuel burning means consists preferably of a burner or burners for fluent fuel, positioned within said air conduit.

The air is preferably preheated before it is burnt, and the means to preheat the air is conveniently and economically such as to make use of the heat present in waste furnace gases. Accordingly, the means to preheat the air consists in so constructing the said air conduit that it puts air flowing in it into heat exchanging relationship with waste furnace gases before said air reaches the fuel burning means of the said burner or burners.

In the ordinary blast furnace, the descending charge undergoes chemical changes while moving slowly down the shaft towards the fusion zone. In a furnace according to the invention, the charge enters the fusion zone very much sooner after its entry into the furnace cavity than is the case in such ordinary blast furnace; but the higher furnace temperatures obtaining in the furnace of the invention result in such chemical changes being accelerated to an extent which enables them to be completed, or at least as sufficiently advanced as may be necessary for practical purposes, in the short period during which the charge is moving towards and into the fusion zone.

An embodiment of the invention is illustrated in the accompanying drawings in which Figure I is a vertical section;

Figure II is a sectional elevation on the line II—II, of Figure I; and

Figure III is a sectional plan on the line III—III of Figure I.

The furnace illustrated in the drawings is, so far as the lower part is concerned, of the normal blast furnace construction; which has the advantage of enabling local high temperatures to be attained by combustion of coke or similarly inexpensive fuel; that is to say it is constructed with a well-like hearth 2, and a bosh 3, with tuyères 4, arranged to inject blast air inwardly into the hearth 2 from which the blast air flows upwardly past the bosh 3 and into the cavity 5 of the shaft 5a; and with means for tapping the melt collected at the bottom of the hearth, such means consisting of the tap holes 6, 7 for slag and metal respectively.

Feeding apertures 8, of which there are four disposed symmetrically around the shaft 5a, are provided in the neighbourhood of the junction of the bosh 3 and the shaft 5a, and more specifically, at a height above the tuyères 4 which is substantially equal to twice the diameter $d$ of the hearth 2.

A feed tube 9 communicates respectively with each of the apertures 8, and is inclined upwardly towards the shaft 5a. At its outer end 10, said tube communicates with the lower end 11 of an external hopper 12, there being one of such hoppers for each feed tube.

A feeder screw 13 is mounted for rotation within each tube 9, and is so arranged relatively to the tube that a part of the tube cavity adjacent the shaft is available to contain a shielding body of charge material 14a. The upward slope of the tube towards the shaft 5a ensures that such shielding body 14a remains gravitationally within the tube 9 throughout the operation of the furnace.

The shielding body 14a of material, in conjunction with material in the lower end of the hopper 11, and in the hopper 12 itself, acts to separate the furnace cavity from the atmosphere; and the shielding body 14a further acts to shield the screw 13 from hot furnace gases and from radiation of heat from within the furnace. The shielding of the screws 13 is also assisted by the presence of the bank 14b of charge material which is built up within the furnace cavity in and about the apertures 8.

Each of the screws 13 is driven through worm gearing 15, which is itself driven by bevel gears 16, 17, the gears 17 being mounted on shafts 18, driven at an equal speed in any convenient manner, for instance by an electric motor 19 provided with speed regulating means 20.

The screws 13 are all of the same dimensions, and, being rotated at equal speeds, they feed charge material into the furnace at an uniform rate, so that the burden 14, 14b, is built up and maintained substantially symmetrically about the shaft axis A—A.

The said apertures 8 are positioned, as above stated, about at the junction of the shaft 5a and the bosh 3, and at this level they feed charge material into the furnace cavity 5 in the proximity of the fusion zone 14c, the upper limit of which may be approximately as is indicated by the dotted line 14d, The restricted depth of burden thus obtained results in the charge entering the fusion zone considerably earlier than it would if fed in at the top of the shaft 5a, as is the case in known blast furnaces. The charge, if it be of the kind which tends to arch in the shaft, reaches the fusion zone before it is able to form a self-sustaining bridge.

Said feeder screws may be provided with water jacketing 21.

Furnace gases leaving the shaft 5a at its upper end 22 pass by way of a conduit 23 to a recuperator 24, and are exhausted therefrom through exhaust orifices 25. Blast air enters the recuperator 24 through inlet orifices 26, and the thus heated air passes through the conduit 27 to the bustle pipe 28, from which it is fed to the tuyères 4.

Comprised in said conduit 27 in a series of burners 29 connected by a common pipe 30 to a source of fuel and preferably of combustible oil under pressure, a valve 31 being comprised in the pipe 30 to control the quantity of oil fed to the burners 29.

The oil used in the burners in such as to be capable of igniting when introduced into blast air which has been heated by its passage through the recuperator 24, so that no specific igniting means need by provided.

During the operation of the fuel, the fuel is injected in a finely divided state into the blast air which is flowing in the conduit 27, and which has already been heated by its passage through the recuperator 24. The oil ignites and burns within the air, thereby raising the temperature of the blast to the extent necessary to result in the furnace temperature required for smelting of the ore being treated; such extent being adjustable by adjustment of the valve 31 controlling the quantity of oil entering the conduit 27. The thus heated resultant gas is thereupon fed into the furnace cavity 5 through the tuyères 4.

Means is provided to seal the hoppers 12 from the atmosphere at all times including during delivery of charge material into the hoppers. Such means comprises, in the case of each hopper, a drum 32 mounted, for rotation about its axis, within the upper part 33 of the hopper, said upper part 33 being formed complementarily to the drum, and so as to form a seal with it, against passage of air between the drum and the hopper walls, throughout the rotation of the drum.

Said drum is formed with an axial slot 34 through which charge material is fed into the drum, and through which such material is discharged to the hopper 12 gravitationally on inversion of the drum.

The said means to seal the hoppers 12 from the atmosphere acts also to prevent escape to the atmosphere of any furnace gas which may have penetrated through the tubes 9 and into the hoppers; and additional means may also be comprised for this purpose, such, for instance, as fan means 35 arranged, through pipes 36, to maintain the gaseous pressure within the hoppers 12 at a figure somewhat in excess of the gaseous pressure within the furnace cavity 5.

I claim:

1. A blast furnace comprising a hearth, an enlarged mid-section where fusion of the charge occurs located above said hearth, a plurality of tuyères opening into the furnace between the hearth and said mid-section, a refractory walled gas chamber above said fusion zone, said gas chamber having an extended vertical section giving a reverberatory effect, a gas outlet for said chamber, a plurality of feed conduits projecting laterally from, and opening into, the said mid-section of the furnace at a level approximately half-way between the hearth and the top of said gas chamber, and feed means for propelling charge material from the feed conduits directly into said mid-section of the furnace.

2. In a blast furnace having a hearth, an enlarged mid-section in which fusion occurs located above the hearth, tuyères opening into the furnace between the hearth and the said mid-section and a shaft having an extended vertical section projecting up above the said mid-section and giving a reverberatory effect; a plurality of circumferentially spaced feed conduits arranged around the furnace and opening into the said mid-section at a level approximately halfway between the hearth and the top of said shaft, said conduits being inclined upwardly toward the axis of the furnace, and feed means for propelling charge material from the feed conduits into the said mid-section of the furnace.

3. In a blast furnace having a hearth, an enlarged mid-section in which fusion of charge material occurs located above the hearth, tuyères opening into the furnace between the hearth and the said mid-section and an empty refractory walled space above the said mid-section of the furnace and above the normal level of charge material in the furnace, said space giving a reverberatory effect, and a discharge conduit for exhaust gases leading from the upper portion of said space; a plurality of feed conduits projecting laterally from, and opening into, said mid-section of the furnace at a height above the tuyères approximately equal to twice the width of the furnace at the tuyère level, said conduits being inclined upwardly toward the axis of the furnace and feed means for propelling charge material from the feed conduits directly into the said mid-section of the furnace.

4. A blast furnace comprising a hearth, walls sloping upwardly and outwardly to a mid-portion, walls extending upwardly from said mid-portion and converging to provide an empty space above the normal level of the charge in the furnace, a discharge conduit for exhaust gases leading from said space to a heat exchanger, an air supply conduit leading from the heat exchanger to a plurality of tuyères disposed between the hearth and said mid-portion, a plurality of feed conduits opening into the said mid-portion of the furnace at a height above the tuyères approximately equal to twice the width of the furnace at the tuyère level and feed means for propelling charge material from the feed conduits directly into the mid-portion of the furnace.

5. A blast furnace according to claim 4, in which means is provided between the heat exchanger to the tuyères further to raise the temperature of the air supply.

6. A blast furnace comprising a hearth, an enlarged mid-section where fusion of the charge material occurs located above said hearth, tuyères between the hearth and the said mid-section, a refractory walled gas chamber above said fusion zone, said gas chamber having an extended vertical section giving a reverberatory effect, a gas outlet for said chamber, a plurality of feed conduits projecting laterally from, and opening into, the said mid-section of the furnace at a level approximately halfway between the hearth and the top of said gas chamber, feed means for propelling charge material from the feed conduits directly into the said mid-section of the furnace, and synchronized driving means for driving said feed means in unison.

7. A blast furnace comprising a hearth, an enlarged mid-portion where fusion of the charge occurs located above said hearth, a plurality of tuyères opening into the furnace between the hearth and said mid-portion, a refractory walled gas chamber above said fusion zone, said gas chamber having an extended vertical section giving a reverberatory effect, a gas outlet for said chamber, a plurality of feed conduits projecting laterally from, and opening into, the said mid-portion of the furnace at a level approximately halfway between the hearth and the top of said gas chamber, feed means for propelling charge material from the feed conduits directly into the said mid-portion of the furnace and means for closing said conduits to inhibit the escape of gas therethrough.

8. A blast furnace comprising a hearth, an enlarged mid-portion where fusion of the charge occurs located above said hearth, a plurality of tuyères opening into the furnace between the hearth and said mid-portion, a refractory walled gas chamber above said fusion zone, said gas chamber having an extended vertical section giving a reverberatory effect, a gas outlet for said chamber, a plurality of feed conduits projecting laterally from, and opening into, the said mid-portion of the furnace at a level approximately halfway between the hearth and the top of said gas chamber, feed means for propelling charge material from the feed conduits directly into the said mid-portion of the furnace, sealing means for closing said conduits to inhibit the escape of gas therethrough, and means for supplying gas under pressure to said conduits at a point between said sealing means and the discharge ends of the conduits.

LESLIE JOHN RICHARDSON.

REFERENCES CITED

The following references are of record in the file of this patent:

UNITED STATES PATENTS

| Number | Name | Date |
|---|---|---|
| 99,415 | De Faur | Feb. 1, 1870 |
| 303,456 | Rae | Aug. 12, 1884 |
| 405,134 | Walsh | June 11, 1889 |
| 766,903 | Ronay | Aug. 9, 1904 |
| 1,166,904 | Harding | Jan. 4, 1916 |
| 1,724,402 | Holden | Aug. 13, 1929 |
| 1,775,606 | Southgate | Sept. 9, 1930 |
| 2,031,504 | Rhodin | Feb. 18, 1936 |
| 2,343,780 | Lewis | Mar. 7, 1944 |
| 2,345,067 | Osann | Mar. 28, 1944 |

FOREIGN PATENTS

| Number | Country | Date |
|---|---|---|
| 276,066 | Great Britain | Aug. 17, 1927 |